US009222502B2

(12) United States Patent
Babej et al.

(10) Patent No.: US 9,222,502 B2
(45) Date of Patent: Dec. 29, 2015

(54) SELF-PIERCING NUT ELEMENT AND COMPONENT ASSEMBLY COMPRISING THE NUT ELEMENT AND A SHEET METAL PART

(75) Inventors: Jiri Babej, Lich (DE); Christian Sowa, Offenbach (DE); Richard Humpert, Bad Nauheim (DE); Michael Vieth, Bad Vilbel (DE)

(73) Assignee: PROFIL VERBINDUNGSTECHNIK GMBH & CO., KG, Friedrichsdorf (DE)

( * ) Notice: Subject to any disclaimer, the term of this patent is extended or adjusted under 35 U.S.C. 154(b) by 210 days.

(21) Appl. No.: 13/192,969

(22) Filed: Jul. 28, 2011

(65) Prior Publication Data

US 2012/0028070 A1    Feb. 2, 2012

(30) Foreign Application Priority Data

Jul. 30, 2010    (DE) .......................... 10 2010 032 866

(51) Int. Cl.
*F16B 37/04*    (2006.01)
*F16B 37/06*    (2006.01)

(52) U.S. Cl.
CPC ....... *F16B 37/062* (2013.01); *Y10T 428/12361* (2015.01)

(58) Field of Classification Search
CPC ...... F16B 37/00; F16B 37/068; F16B 37/065; F16B 37/062; F16B 37/04; F16B 37/048; F16B 37/122; Y10T 428/12361
USPC ................................................. 411/179–181
See application file for complete search history.

(56) References Cited

U.S. PATENT DOCUMENTS

| | | | | |
|---|---|---|---|---|
| 1,332,687 | A | * | 3/1920 | Reynolds ....................... 220/304 |
| 2,026,757 | A | * | 1/1936 | Swanstrom ................... 411/180 |
| 3,213,914 | A | | 10/1965 | Baumle et al. |
| 3,252,831 | A | | 5/1966 | Ragan |

(Continued)

FOREIGN PATENT DOCUMENTS

| DE | 29 47 179 A1 | 5/1981 |
|---|---|---|
| DE | 10 2004 017 866 A1 | 11/2005 |

(Continued)

OTHER PUBLICATIONS

European Search Report in corresponding European Patent Application No. 11 00 6297 dated Oct. 25, 2011.

(Continued)

*Primary Examiner* — Roberta Delisle
(74) *Attorney, Agent, or Firm* — Hershkovitz & Associates, PLLC; Abraham Hershkovitz; Eugene C. Rzucidlo

(57) ABSTRACT

A self-piercing nut element having a strength in the range between 700 and 900 MPa is designed for press fitting into a sheet metal part, for the self-piercing attachment of the nut element into a higher strength sheet metal part, such that the piercing section merges directly into the sheet metal contact surface and such that the piercing section has a piercing edge at its free end face, with the piercing edge being spaced apart from the sheet metal contact surface by a peripheral surface having an axial height which corresponds to at least 30%, and preferably at least 50%, of the sheet metal thickness. The radial wall thickness of the piercing section in the region of its free end face from the outer side up to the nominal diameter of the thread corresponds to a thickness between 1.2 times, to 1.8 times, the provided sheet metal thickness.

16 Claims, 4 Drawing Sheets

(56) References Cited

U.S. PATENT DOCUMENTS

| | | | |
|---|---|---|---|
| 3,253,631 A * | 5/1966 | Reusser | 411/179 |
| 3,276,499 A * | 10/1966 | Reusser | 411/179 |
| 3,736,969 A * | 6/1973 | Warn et al. | 411/179 |
| 3,775,791 A | 12/1973 | Grube | |
| 4,018,257 A * | 4/1977 | Jack | 411/181 |
| 4,810,143 A * | 3/1989 | Muller | 411/181 |
| 5,439,336 A * | 8/1995 | Muller | 411/179 |
| 5,564,873 A * | 10/1996 | Ladouceur et al. | 411/180 |
| 5,613,815 A * | 3/1997 | Muller | 411/181 |
| 5,617,652 A * | 4/1997 | Muller | 36/134 |
| 6,220,804 B1 | 4/2001 | Pamer | |
| 7,001,125 B2 * | 2/2006 | Wojciechowski et al. | 411/180 |
| 7,383,624 B2 * | 6/2008 | Wojciechowski et al. | 29/521 |
| 7,591,623 B2 * | 9/2009 | Parker | 411/180 |
| 7,878,746 B2 * | 2/2011 | Babej | 411/179 |
| 8,083,451 B2 * | 12/2011 | Babej et al. | 411/179 |
| 8,092,131 B2 | 1/2012 | Shuart | |
| 8,221,040 B2 * | 7/2012 | Babej et al. | 411/183 |
| 8,371,785 B2 * | 2/2013 | Babej et al. | 411/180 |
| 8,517,651 B2 * | 8/2013 | Babej | 411/179 |
| 2005/0180838 A1 * | 8/2005 | Shinjo | 411/179 |
| 2005/0265801 A1 * | 12/2005 | Ward et al. | 411/179 |
| 2006/0225267 A1 * | 10/2006 | Wojciechowski et al. | 29/515 |
| 2007/0258788 A1 * | 11/2007 | Gardstam | 411/176 |
| 2009/0196678 A1 * | 8/2009 | Babej et al. | 403/19 |

FOREIGN PATENT DOCUMENTS

| | | |
|---|---|---|
| DE | 20 2005 015 713 U1 | 1/2006 |
| DE | 10 2009 009 482 A1 | 9/2010 |
| EP | 1 690 013 B1 | 11/2007 |
| EP | 1 892 427 A2 | 2/2008 |
| FR | 2 598 189 A1 | 11/1987 |
| WO | WO 94/01 688 A1 | 1/1994 |
| WO | WO 2007/ 121 998 A1 | 11/2007 |

OTHER PUBLICATIONS

English language translation of European Search Report in corresponding European Patent Application No. 11 00 6297 dated Oct. 25, 2011.

German Search Report in corresponding German Patent Application No. 102009039817.1 dated Feb. 18, 2014.

* cited by examiner

SELF-PIERCING NUT ELEMENT AND COMPONENT ASSEMBLY COMPRISING THE NUT ELEMENT AND A SHEET METAL PART

CROSS-REFERENCE TO RELATED APPLICATIONS

This application claims priority of German Patent Application No. 10 2010 032 866.9, filed Jul. 30, 2010, the disclosure of which is expressly incorporated by reference herein in its entirety.

FIELD OF THE INVENTION

The present invention relates to a self-piercing nut element which is designed for press fitting into a sheet metal part, with the nut element having the following features: a head part forming a flange, a central bore in the head part which is designed for receiving a bolt element and a central longitudinal axis, a sheet metal contact surface formed at the flange in a plane standing at least substantially perpendicular to the central longitudinal axis as well as a piercing section extending away from the head part in the direction of the longitudinal axis on the side of the sheet metal contact surface. The present invention further relates to a component assembly comprising such a nut element which is attached to a sheet metal part.

BACKGROUND OF THE INVENTION

In the field of connection elements which are mechanically attached to sheet metal parts on the production thereof, a distinction is made between press-in elements, on the one hand, and riveting elements, on the other hand. Press-in elements are characterized in that they are at least not intentionally deformed on attachment to a sheet metal part, but that rather the sheet metal part itself is deformed and brought into engagement with shape features of the press-in element, whereby the press-in element is fastened to the sheet metal part in a manner secure against rotation and against being pressed out. With riveting elements, the rivet section of the element is intentionally deformed on the attachment to the sheet metal part, usually to form a rivet bead, whereby the sheet metal part is captured between the rivet bead and a flange part in order also here to achieve a connection secure against rotation and against being pressed out.

Both press-in elements and riveting elements are furthermore known in the form of self-piercing elements. The name self-piercing is to be understood such that the corresponding element punches its own hole in the sheet metal part; naturally only when a sufficient force is exerted onto the self-piercing element, for example by a press, by a robot or by a power-actuated pair of tongs, which presses the self-piercing element against the sheet metal part, with the sheet metal part being supported on a corresponding die button on the side remote from the element.

It was previously usual in automotive construction to use self-piercing elements with sheet metal parts which have a strength below approximately 300 MPa. The self-piercing elements which are then used usually have a strength in the range between 700 and 900 MPa and, in exceptional cases, up to approximately 1250 MPa, which is absolutely sufficient to stamp out a hole in the sheet metal part on the application of the connection element to the sheet metal part, in particular when the sheet metal part has a thickness of less than approximately 3 mm. Strengths of the elements up to approximately 850 MPa apply, for example, to elements of class 8, whereas higher strengths apply to elements of classes 10 and 12 which normally make a heat treatment and/or a specific choice of material of the corresponding elements necessary.

In the connection elements used, the material of the connection element in the unprocessed state usually has a strength of approximately 380 MPa. This strength increases, however, to values in the range between 700 and 900 MPa solely due to the cold deformation which is used to generate a fastening element by cold heading starting from a bar material.

For some purposes, connection elements are required which have a higher strength than 900 MPa. They are then manufactured from a material which can be hardened by a heat treatment, whereby a higher strength is reached. Such heat treatments are, however, unwanted in many cases. They represent an alien process in comparison with the manufacture of the connection elements using cold heading and are usually not even carried out in the same factory in which the connection elements are manufactured, whereby a substantial expenditure of time and cost is involved in producing heat-treated elements of higher strength.

On the other hand, sheet metals having higher strength are increasingly being used in automotive construction and in some cases also heat-treated sheet metal parts which have higher strengths above the usual strength range from 700 to 900 MPa for connection elements. Such sheet metal parts having higher strength make it possible, on the one hand, to work with thinner metal sheets, whereby weight can be saved, but make it extremely difficult, on the other hand, to work with self-piercing elements.

SUMMARY OF THE INVENTION

It is the underlying object of the present invention to provide a self-piercing nut element which, with a strength in the range between 700 and 900 MPa, can be introduced in a self-piercing manner into sheet metal parts (both with regard to sheet metal parts having lower strengths of up to 300 MPa and also with regard to sheet metal parts having higher strengths above 300 MPa up to above 1600 MPa). Such nut elements in accordance with the invention are very largely press-in elements. Furthermore, the nut element in accordance with the invention or the component assembly in accordance with the invention should be able to be manufactured relatively inexpensively.

Provision is made in accordance with the invention to satisfy this object with a nut element of the initially named kind which is characterized in that the nut element is designed, for the self-piercing attachment into a higher strength sheet metal part, such that the piercing section merges directly into the sheet metal contact surface and such that the piercing section has a piercing edge at its free end face, with the piercing edge being spaced apart from the sheet metal contact surface by a peripheral surface having an axial height which corresponds to at least 30%, and preferably at least 50%, of the sheet metal thickness, with the radial wall thickness of the piercing section in the region of its free end face from the outer side of the piercing section up to the nominal diameter of the thread (with non-square or circular piercing sections, the smallest radial wall thickness) corresponding to a thickness between 1.2 times, to 1.8 times, and preferably 1.5 times, the provided sheet metal thickness.

The corresponding component assembly comprising the self-piercing nut element and a sheet metal part is characterized in that the sheet metal part has a pierced hole having a shape corresponding to the shape of the piercing section; in that the material of the sheet metal part has a recess surrounding the piercing section at the side of the sheet metal part remote from the sheet metal contact surface and adjacent to the piercing section; and in that the material of the hole rim extends into a constriction and/or a groove of the nut element which is formed radially in the piercing section.

It has namely surprisingly been found in accordance with the invention that with a suitable design of the piercing section, in the sense that it is provided with an at least substantially cylindrical section having an axial height which corresponds to at least 50% of the sheet metal thickness, preferably more, it is also able to pierce a hole in the sheet metal part when the sheet metal part has a higher strength in the range from larger than 900 to above 1600 MPa, and preferably of 1500 MPa.

The invention is not, however, exhausted only in the piercing of the corresponding pierced hole, but rather the sheet metal part has to be fastened to the nut element after production of the pierced hole so that the nut element contacts the sheet metal part in a manner secured against rotation and against being pressed out. It is particularly surprising that the nut element as supplied prior to fitting to the sheet metal part does not have any features such as an undercut in the piercing section which could ensure the securing against being pressed out or the resistance against being pressed out. Nevertheless, a high-grade security against being pressed out is achieved, and indeed because, on the cutting out of the panel slug and/or on the attachment to the sheet metal part, which generally has twice the strength value in comparison with the nut element, the sheet metal material deforms the softer nut element and extends into the body of the nut element and is located in a ring groove there which extends radially into the piercing section and is formed there under the pressure of the sheet metal material which is generated by the die button. In this respect the groove or the corresponding constriction of the piercing section can arise by the forces which prevail during the piercing of the sheet metal part by means of the nut element and with the aid of the die button and/or on the formation of the ring recess in the side of the sheet metal part remote from the sheet metal contact surface by the die button. It is particularly surprising that such a deformation of the nut element, i.e. the formation of a groove which extends radially into the piercing section, can also be achieved when the sheet metal part has a lower strength than that of the nut element.

It has been found that it is entirely possible with higher-strength or thicker sheet metal parts (also those having a strength which is less than that of the element itself) to deform the sheet metal material by means of a die using a corresponding annular nose in the region of the hole rim such that a recess arises adjacent to the piercing section. Furthermore, due to the displacement of the sheet metal material and a simultaneously attempted radial dilation of the piercing section, which arises due to the compression on the piercing of the sheet metal material, a substantial pressure on the face of the hole arises which provides security against rotation.

If a higher security against rotation should be desired, this can be realized in a variety of manners. One possibility is to provide the sheet metal part and/or the functional element with an adhesive layer, for example one which hardens at higher pressures. Correspondingly higher pressures arise on the attachment of the fastening element to the sheet metal part, whereby the security against rotation is then achieved or facilitated.

Another possibility is to design the piercing section polygonal with rounded corners in a plan view at the transitions from one side of the polygon to the next. A very high security against rotation is ensured by the polygonal shape of the piercing section.

The head part can also have a polygonal shape corresponding to the polygonal shape of the piercing section, likewise with rounded corners. The rounded corners are important because, particularly with higher-strength sheet metal parts, the sharp edges which would otherwise arise at the transitions from one side of the polygon to the next would result in a substantial danger, which is not to be underestimated, that fatigue cracks form in the sheet metal part and the connection which is sought with the nut element fails in operation. It is furthermore ensured by the rounded shape of the head part that likewise no stress-increasing deformations of the sheet metal part arise on the radially outer side of the sheet metal contact surface, whereby the service life could be reduced.

To utilize this polygonal shape of the piercing section or of the head part in a reasonable manner, it should be selected from the group square, rectangular, pentagonal or hexagonal.

In an embodiment in which the piercing section has a polygonal shape, there is also the possibility to design the head part as circular in a plan view provided that the alignment of the head part about the longitudinal axis of the element can be ensured since, with a polygonal shape of the piercing section, the piercing die would have to have a corresponding shape or a corresponding piercing opening and the element then necessarily has to be aligned angle-wise with the die. Such an alignment of the element could be achieved, for example, via two conical recesses in the end face of the head part remote from the sheet metal part, with corresponding conical projections at the plunger of the setting head engaging into these conical recesses and being able to provide a corresponding positioning of the element. One or two grooves or ribs at the periphery of the head part could also be considered as alignment aids.

There is, however, also the possibility to design the total nut element so that the piercing section and the head part are at least substantially circular in a plan view. Different measures then have to be taken to ensure the security against rotation. This can take place, for example, in that noses providing security against rotation are provided which have the shape at the piercing section of ribs extending from it in the axial direction.

It should be noted at this point that, by means of the present invention, a new class of press-in elements has been created in which the element and the sheet metal part are deformed on the attachment of the nut to the sheet metal part and indeed not a deformation of the element which is achieved in the sense of a peeling formation of a ring collar such as is described in U.S. Pat. No. 3,213,914, but rather a deformation of the element in the sense of the formation of a constriction of the piercing section or the formation of a groove around the piercing section which occurs during the upsetting of the element be it during the piercing of the sheet metal part and/or by the stranglehold of the sheet metal part, i.e. through the clamping hoop stress in the sheet metal part.

BRIEF DESCRIPTION OF THE FIGURES

Preferred embodiments of the nut element or of the component assembly of the present invention can be seen from the dependent claims as well as from the still following description of examples with reference to the enclosed drawings in which the following is shown, in each case to scale:

DETAILED DESCRIPTION OF THE INVENTION

Figure 1A:
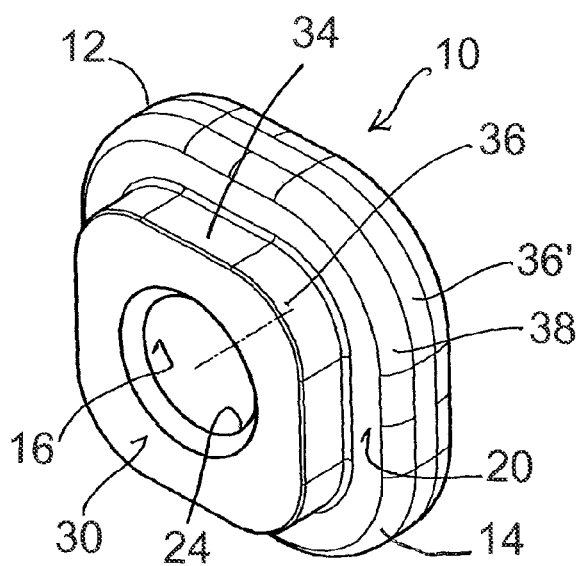
FIGS. 1A-1C representations of a first embodiment of a nut element in accordance with the invention in a perspective representation (FIG. 1A), an axial view of the left hand end face of the element (FIG. 1B) and a side view of the element in accordance with the invention partly in an axial half-section (FIG. 1C)
Figure 1B:
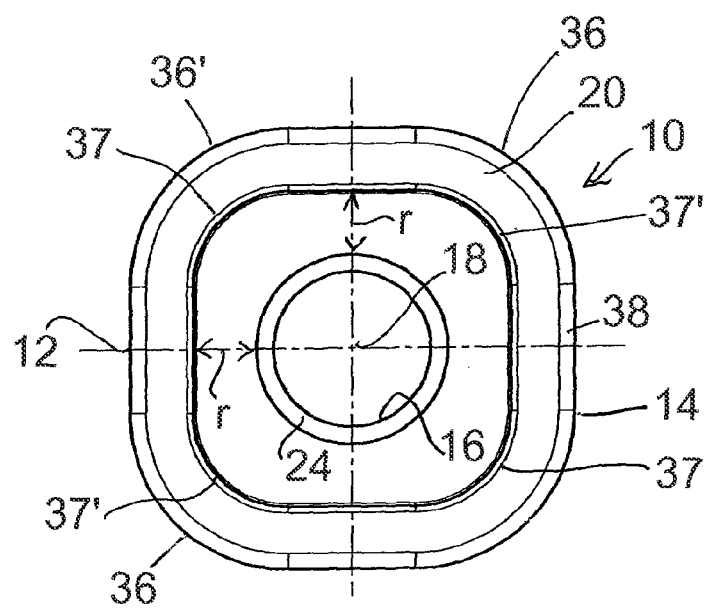
Figure 1C:
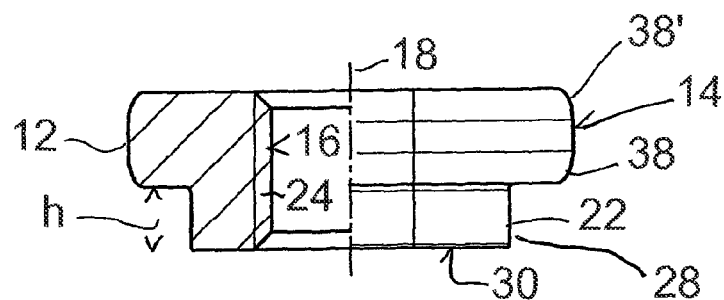

FIGS. 1A to 1C first show a first embodiment of a self-piercing nut element 10 in accordance with the invention having a strength in the range between 700 and 900 MPa, in exceptional cases up to approximately 1250 MPa, which can be used for press fitting into a sheet metal part of higher strength of up to 1500 MPa and even higher than 1600 MPa, but also with sheet metal parts of lower strength and finally also with sheet metal parts having strengths of below 300 MPa, with the nut element having the following features:

A head part 14 forming a flange 12, a middle bore 16 in the head part 14 which is designed for receiving a bolt element (not shown) and a central longitudinal axis 18, a sheet metal contact surface 20 formed at the flange 12 in a plane standing at least substantially perpendicular to the central longitudinal axis 18 as well as a piercing section 22 extending away from the head part 14 in the direction of the longitudinal axis 18 on the side of the sheet metal contact surface. The bolt element can, for example, be a threaded bolt so that the nut element 10 is here provided with a threaded cylinder 24, i.e. the bore 16 is a threaded bore. It could, however, also be a pin in the form of a bearing pin. In this case, the threaded cylinder is replaced with a smooth bore. The bore could, however, first be made as a smooth bore and be dimensioned so that a thread forming or thread cutting bolt can be used.

For the self-piercing attachment of the nut element 10 into a sheet metal part, in particular but not exclusively into a sheet metal part having higher strength, the nut element is designed such that the piercing section 22 merges directly into the sheet metal contact surface and such that it furthermore has a piercing edge 28 at its free end face 30, with the piercing edge 28 being spaced apart from the sheet metal contact surface 20 by a peripheral surface 34 having an axial height h which corresponds to at least 50% of the sheet metal thickness.

The self-piercing nut element 10 of FIGS. 1A to 1C as well as all further nut elements disclosed here in accordance with the present teaching are in particular but not exclusively designed for use with sheet metal parts having a strength in the range from more than 900 to above 1600 MPa, preferably of approximately 1500 MPa. It is important that sufficient material is present behind, i.e. on, the head part side of the piercing edge 28 in the region of the named peripheral surface 34 so that the piercing section can perform the required piercing work. A certain deformation of the piercing section 22 is, however, possible and even desired so that the higher-strength sheet metal material can be pressed into the piercing section for the formation of a ring constriction and or a ring groove 26 (FIG. 2C). Generally, the piercing section should, however, be designed so that, i.e. with a radial thickness and an axial height h, no unwanted deformation (apart from the groove or the constriction 26) occurs under the piercing forces. In practice, this means that the axial height h and the radial thickness r of the piercing section should be dimensioned as follows:

The axial height of the named periphery surface should correspond to at least 30%, and preferably to at least 50%, of the sheet metal thickness, with axial heights up to 100% of the sheet metal thickness and even beyond being possible if the element is attached to the sheet metal part within a bead. As a rule, it is important that the free end face of the piercing section does not project beyond the side of the sheet metal part remote from the head part, wherein the free end face should usually be set back up to approximately 0.02 mm with respect to the named side of the sheet metal part. A further component can hereby be screwed directly to the sheet metal part and the desired direct clamping of the component to the sheet metal part is achieved. This, however, means that the axial height of the piercing section, i.e. the peripheral surface, may not be larger than 100% of the sheet metal part thickness, unless the nut element is attached within a bead at the sheet metal part. In this case, the selection of the axial depth of the bead always allows an arrangement in which the free end face of the piercing section of the nut element is always set back from the plane of the side of the sheet metal part remote from the head part of the nut element outside the bead, and indeed independently of the respective sheet metal part thickness.

The radial wall thickness r of the piercing section in the region of its free end face from the outer side up to the nominal diameter of the thread (i.e. the outer diameter of the thread, i.e. with an M8 thread a diameter of 8 mm and a radius of 4 mm) is in the range between 1.2 times and 1.8 times, and preferably 1.3 times and 1.7 times, and in particular at approximately 1.5 times, the provided sheet metal thickness.

If the radial wall thickness r is selected too small, there is the risk of unwanted deformation of the piercing section, in particular under circumstances unfavorable from a tolerance aspect. If, in contrast, it is selected too large, the nut element becomes unnecessarily heavy. The value of 1.5 times the sheet metal part thickness has proved to be favorable.

With non-square or circular piercing sections, the dimension r is to be understood as the smallest radial wall thickness, as drawn in the FIGS., with the dimension r then being able to be selected somewhat smaller than 15 times the sheet metal part thickness, for example, 1.2 times the sheet metal part thickness.

Figure 2A:
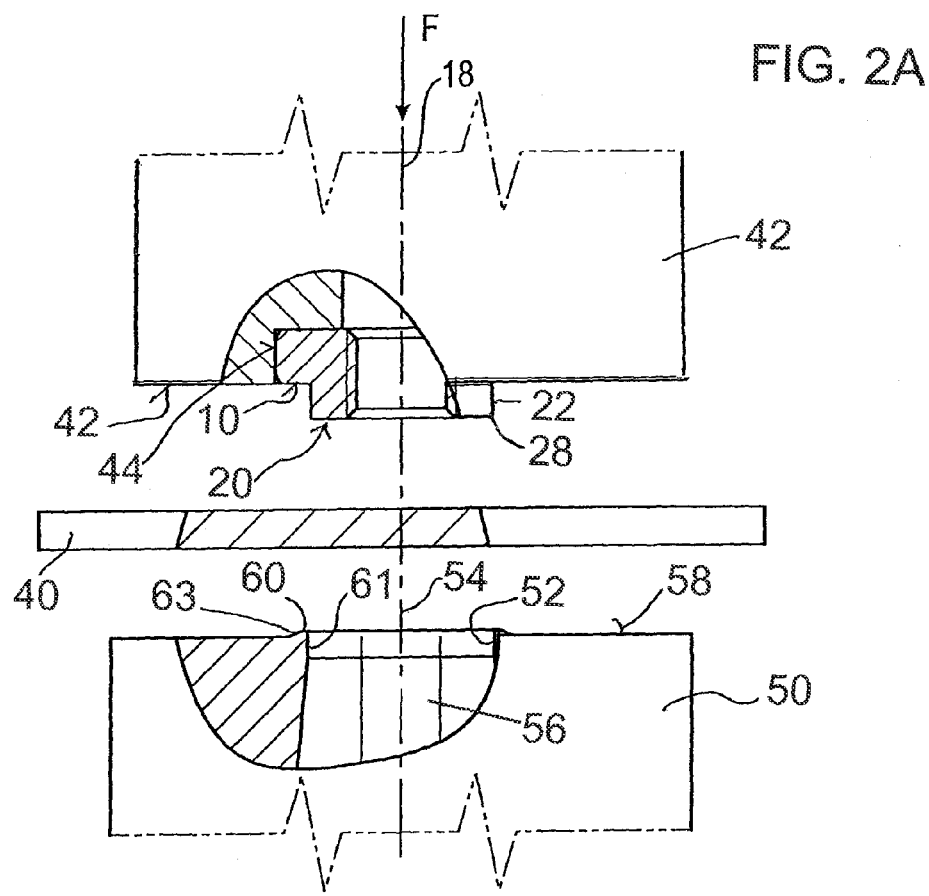
FIG. 2A the tools which are used for attaching the nut element in accordance with the invention in accordance with FIG. 1A in a sheet metal part.

FIG. 2A schematically shows the tools which are used to punch the nut element in accordance with FIGS. 1A to 1C or comparable elements into a sheet metal part 40. The tool comprises a setting head 42 which is provided with a receiver 44 which is matched to the head shape of the nut element 10 so that the piercing section 22 projects in front of the lower end face 46 of the setting head 42. The sheet metal contact surface 20 of the nut element 10 is in the same plane as the end face 46 of the setting head 42.

Setting heads of this kind are very well known and are usually designed for the automatic supply of nut elements from a store into the receiver 44. Examples for such setting heads are contained inter alia in the European patent EP 755749 B2 of the present applicant. Furthermore, for example, a setting head could be used as is described in GB-A-934101.

A die 50 is located beneath the sheet metal part 40 and has a central opening 52 whose cross-sectional shape corresponds to that of the piercing section 22, with the die opening 52 being made slightly larger than the piercing section 22 so that it fits into the opening 52 with small clearance. The opening 52 could, for example, be approximately 0.01 mm larger in diameter in its transverse dimension in comparison with the piercing section 22. The opening 52 has a central longitudinal axis 54 which is aligned with the central longitudinal axis 18 of the nut element 10.

Since the opening 52 of the die should receive the piercing section 22 at least in the region of its end edge, the die must be aligned in the corresponding tool of the press in accordance with the alignment of the nut element 10 in the setting head.

It should furthermore be mentioned that the passage 56 beneath the opening 52 diverges away from it so that the panel plug which arises when the nut element 10 is pressed by a force acting in the arrow direction F toward the sheet metal part and toward the die, whereby a panel slug is punched out of the sheet metal part by means of the cooperation between the piercing section 22 and the die 50 and is finally disposed of via the diverging passage 56. In this Figure, a so-called hold-down member (not shown) can be integrated into the setting head 42. This hold-down member has the task of pressing the sheet metal part 40 firmly toward the end face 58 of the die or toward the tool receiving the die 50 before the piercing of the sheet metal part. The hold-down member can, for example, be formed by a cylindrical part which surrounds the shown body of the setting head 42 and can be pre-stressed downwardly.

The die 50 is usually received in the lower tool of a press, and indeed so that the upper end face lies flush with the surface of the lower tool in FIG. 2A. The setting head 42 is then mounted either at in intermediate plate of the press or at the upper tool of the press. It is equally possible to accommodate the die 50 in the intermediate plate of a press and then to arrange the setting head 42 in the upper tool of the press. Furthermore, reverse arrangements are also possible in which the die 50 is arranged above the setting head 42, for example so that the setting head 42 is arranged facing upwardly in the lower tool of the press or in the intermediate plate of the press, whereas the die would then consequently also have to be arranged in the reverse position with respect to FIG. 2A in the intermediate plate of the press or in the upper tool of the press.

Finally, it is not necessary to use a press for punching in the nut element 10, but this function could rather be taken on by a robot equipped with corresponding tools or by a power-actuated pair of tongs.

A nose 60 is located around the opening 52 of the die and has, in plan view, a square shape with rounded corners in accordance with the outline shape of the piercing section 22. The nose 60 has a perpendicular flank 61 which surrounds the opening 52 and an oblique flank 63.

On the closing of the press or of the tool in accordance with FIG. 2A, the piercing section 22 punches a panel slug out of the sheet metal part 40 which then falls through the passage 56 of the die and can be disposed of from the press. The piercing of the sheet metal part takes place on the basis of shear forces which arise between the piercing edge 28 of the piercing section 22 and the boundary of the opening 52 at the upper side of the die.

Not only the sheet metal part, but also the piercing section 22 is deformed on the piercing through of the sheet metal part due to the enormous forces which are present on piercing. Hereby the piercing edge 28 is pressed upwardly and the piercing section 22 is pressed outwardly. Thus, above this deformation an undercut arises in the form of a groove 26.

During the piercing of the sheet metal part, the annular nose 60 also presses toward the lower side of the sheet metal part and there forms a recess 62 which extends around the piercing section 22 in the region of its end edge. The material which is displaced through the formation of the recess 62 is forced, due to the substantial compression within the press, to flow into the groove 26 at the piercing section 22, whereby the sheet metal part 40 is connected with shape matching to the nut element 10. Furthermore, the nose 60 ensures that the slug is cleanly separated from the remainder of the sheet metal part, without the piercing section 22 having to project beyond the lower plane of the sheet metal, but rather remaining behind the plane by approximately 0.2 mm.

The nut element 10 is held with security against rotation about the axis 18 in the sheet metal part since here the square shape of the piercing section 22, which is arranged in the shape-matched pierced opening in the sheet metal part 40, prevents a mutual rotation of the sheet metal part and of the nut element. Through the material which is located in the groove 26 there arises not only a high friction at the side of the hole between the sheet metal part and the nut element which contributes to the security against rotation, but also a shape matched connection is produced such that the pressing of the nut element out of the sheet metal part 40 in the pressing out direction 66 is not possible or is only possible on the application of considerable destructive forces. The risk that the nut element 10 is also urged downwardly in the opposite direction (opposite to the direction of the arrow 66) is not present because the sheet metal contact surface 20 is seated over its full area on the surface of the sheet metal part 40 and prevents it.

Figure 2B:
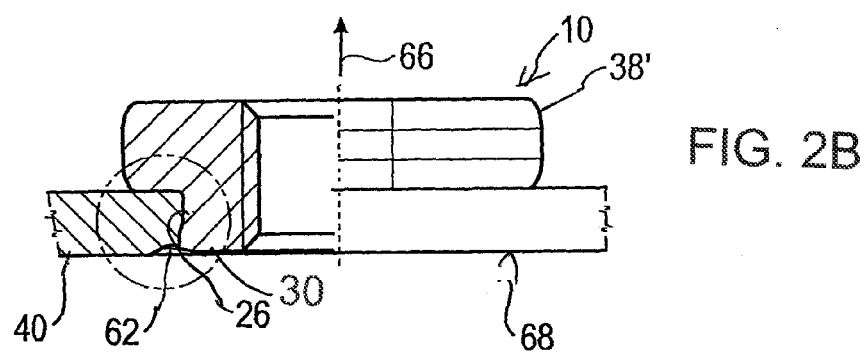
FIG. 2B a view in accordance with FIG. 1C, but with a nut element fastened to the sheet metal part.
Figure 2C:
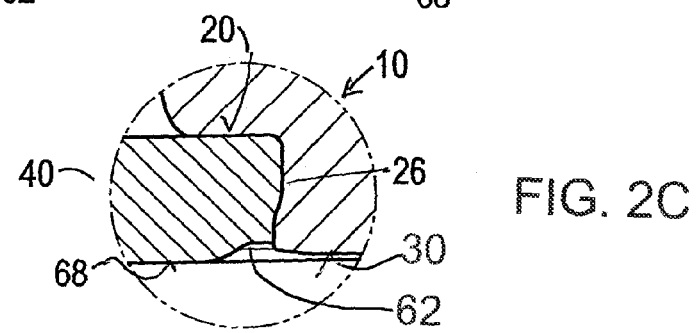
FIG. 2C an enlarged representation of the shape matching between the nut element in accordance with the invention and the sheet metal part in accordance with FIG. 2B.

The overlap in the region of the groove 26 of the piercing section is shown to large scale in FIG. 2C. In operation, a further component is attached to the lower side 68 of the sheet metal part 40 in FIG. 2A, and indeed by means of a threaded bolt whose thread is screwed into the thread 24 coming from the bottom in FIG. 2B. It can be seen from the drawings of FIGS. 2B and 2C that the lower end face 30 of the piercing section 22 is slightly set back with respect to the lower side 68 of the sheet metal part. This means that in the bolted up situation, i.e. when a further component is fastened to the sheet metal part 40 by means of the aforesaid screw bolt, the end face 30 of the nut element is positioned so that the sheet metal part 40 and the further component lie areally at one another at least in the region of the nut element 10 and can be tensioned toward one another in the sense of a high-grade bolted joint.

The self-piercing nut element in accordance with the present teaching is preferably designed so that the piercing section is polygonal in a plan view with rounded corners 37 and 37' at the transitions from one side of the polygon to the next. This also applies for the shape of the head part 14 in the embodiment shown in accordance with FIGS. 1A to 1C, i.e. this also provided with rounded corners 36 and 36' at the transitions from one side of the polygon to the next. In the example of FIGS. 1A to 1C, the polygonal form of the piercing section 22 and of the head part 14 is square.

Figure 3A:
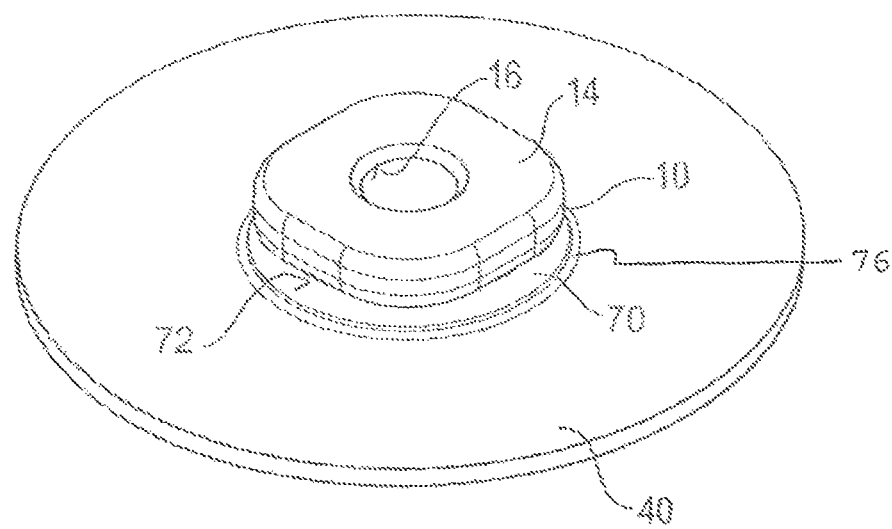
FIGS. 3A, 3B the arrangement of the nut element in accordance with FIGS. 1A-1C in or at a bead in the sheet metal part.
Figure 3B:
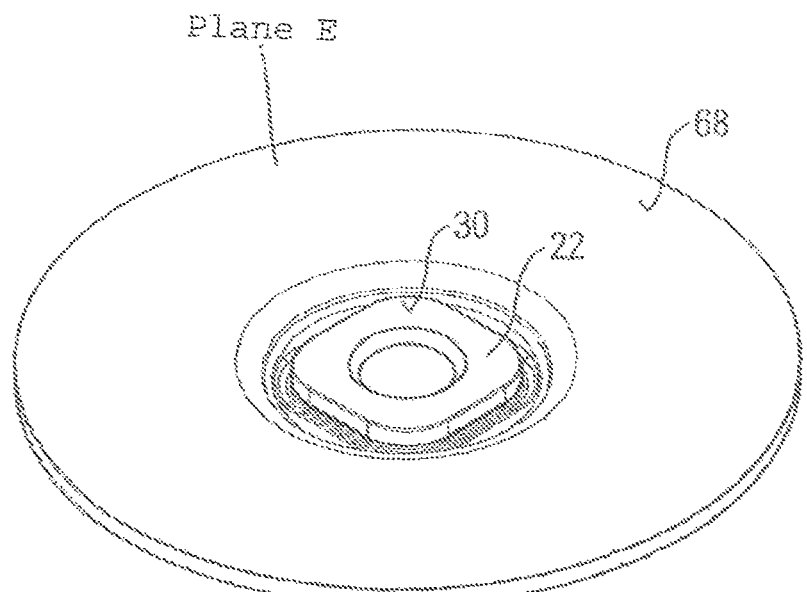

FIGS. 3A and 3B show the possibility of the arrangement of the nut element at the sheet metal part in the region of a bead 70. The sheet metal contact surface 20 of the nut element 10 here lies on the upper side 72 of the base surface of the bead 70 of the sheet metal part 40 in FIG. 3A. It can be seen from FIG. 3B, i.e. in the representation of the lower side of the sheet metal part in accordance with FIG. 3A that the end face 30 of the nut element 10 does not project beyond the lower sheet metal side 68 of the sheet metal part in FIG. 3B. From these drawings in accordance with FIGS. 3A and 3B it is evident that the piercing section can have a length which exceeds the thickness of the sheet metal part without the free end face 30 of the piercing section 22 projecting beyond the lower side 68 of the sheet metal part outside of the bead 70.

It further results overall from the drawings that the head part 14 of the nut element is provided with rounded boundary surfaces, such as 36, 36', 38 and 38', which can be generated by means of a cold-pressing method during the manufacture and which ensure that no sharp edges lead to fatigue cracks in the adjacent regions of the component and/or the sheet metal part 40.

The material of the sheet metal part is received with shape matching in the groove 26 which is formed in all embodiments. The reference numerals otherwise used are to be understood as before, i.e. the previous description applies equally to shape features which are marked by the same reference numerals.

Figure 3C:
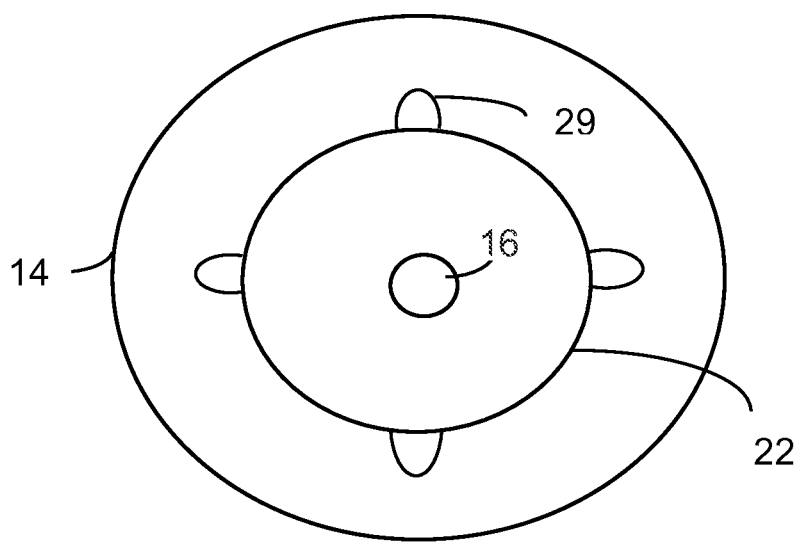
FIG. 3C representation of the piercing section and a head part analogous with FIG. 1B showing the head part being substantially circular in plan view, with noses which have the shape at the piercing section of ribs extending from it in the axial direction.

If the nut element is provided with noses 29 providing security against rotation, which have the shape of ribs extending in the axial direction at the piercing section which are arranged at the peripheral surface, as graphically represented in FIG. 3C, then recesses providing security against rotation in accordance with the shape of the ribs providing security against rotation are provided in the hole rim of the sheet metal part in the completed component assembly.

The result of the attachment of a nut element 10 in accordance with the present teaching is a component assembly comprising the self-piercing nut element 10 and a sheet metal part 40 and is characterized in that the sheet metal part 40 has a pierced hole having a shape in accordance with the shape of the piercing section 22; in that the material of the sheet metal part 40 has a recess 62 surrounding the piercing section 22 on the side 68 of the sheet metal part remote from the sheet metal contact surface 20 and adjacent to the piercing section; and in that the material of the hole rim extends into the nut element 10 due to the formation of the recess 62 and is located in a groove 26 which extends radially into the piercing section 22 and possibly also axially into the part 14 in the region of the transition from the peripheral surface 34 into the sheet metal contact surface 20.

It is particularly favorable if the sheet metal part 40 lies in one plane in the region of the attachment of the nut element and also radially outside the region and if the free end face 30 of the piercing section 22 is set back from the side remote from the sheet metal contact surface.

Some remarks are required at this point. The piercing section 22 or the groove 26 can have a shape in plan view which is selected from the group square, rectangular, pentagonal or hexagonal. Furthermore, in accordance with another embodiment of the piercing section 22, this (as well as the head part 14) can have a circular cross-section, such as graphically represented in FIG. 3C.

The peripheral surface 34 can have either an axial-parallel extent or an included angle with the longitudinal axis of more than 0° to 5° in any desired radial planes which include the longitudinal axis 18 The statement that the piercing section 22 merges directly into the sheet metal contact surface does not preclude that a radius or a chamfer is present there, but rather means that no groove 26 is provided in the nut element itself before the attachment to the sheet metal part. The piercing section can, however, be designed so that it diverges at an included angle in the range between 0° and 5° with respect to the central longitudinal axis 18 going from the head part 14 to the free end face 30.

The sheet metal part (40) is provided with a bead (70). The side (76) of the sheet metal part (40) remote from the sheet metal contact surface (20) directly outside the bead lies in a plane (E). The free end face (30) of the piercing section (22) projects within the bead (70) in front of the side (76) of the sheet metal part (40) remote from the sheet metal contact surface, but is set back from the named plane (E). The nut element (10) is provided optionally with noses shaped like ribs providing security against rotation which have the shape at the piercing section (22) of ribs which extend in the axial direction and which are arranged at the peripheral surface (34). Recesses providing security against rotation are formed in accordance with the shape of the ribs providing security against rotation in the hole rim of the sheet metal part (40).

In all embodiments, all materials can be named as examples for the material of the fastening elements which achieve the strength values within the framework of the cold shaping of class 8 in accordance with the ISO standard or higher, for example a 35B2 alloy in accordance with DIN 1654.

The invention claimed is:

1. A component assembly comprising a sheet metal part (40) and a self-piercing nut element (10) which is designed for press fitting into the sheet metal part (40), wherein the nut element prior to press fitting into the metal sheet (40) has the following features:
  a head part (14) forming a flange (12), a central bore (16) in the head part which is designed for receiving a bolt element and a central longitudinal axis (18), a sheet metal contact surface (20) formed at the flange (12) in a plane standing at least substantially perpendicular to the central longitudinal axis as well as a piercing section (22) extending away from the head part in the direction of the longitudinal axis on the side of the sheet metal contact surface,
  wherein the nut element is designed for the self-piercing attachment of the nut element into a higher strength sheet metal part (40), such that the piercing section (22) merges directly into the sheet metal contact surface (20) wherein piercing section (22) has a flat/planar end face and such that the piercing section (22) has a piercing edge (28) at its free end face wherein the piercing edge (28) of piercing section (22) defines free end face (30), with the piercing edge (28) being spaced apart from the sheet metal contact surface (20) by a peripheral surface (34) having before the attachment to the sheet metal part either an axial-parallel extent or an angle included with the longitudinal axis of larger than 0° to 5° in any desired radial planes, which include the longitudinal axis, with the peripheral surface (34) having a divergent extent going from the sheet metal contact surface (20) up to the piercing edge (28), the peripheral surface (34) further having an axial height which corresponds to not more than 100% of the sheet metal thickness, with a radial wall thickness of the piercing section in the region of its free end face from the outer side of the piercing section up to the nominal diameter of the a thread corresponding to a thickness between 1.2 times, to 1.8 times of the sheet metal part;
  wherein the sheet metal part (40) has a pierced hole having a shape in accordance with the shape of the piercing section (22);
  wherein the material of the sheet metal part (40) after pressing has a recess (62) surrounding the piercing section (22) on the side (68) of the sheet metal part remote from the sheet metal contact surface (20) and adjacent to the piercing section; and
  wherein the material of a hole rim extends into the nut element (10) due to the formation of the recess (62) and is located in a groove (26) which extends radially into the piercing section (22) and axially into the head part

(14) in the region of the transition from the peripheral surface (34) into the sheet metal contact surface (20).

2. The component assembly in accordance with claim 1, wherein the nut element (10) has a strength in the range from 700 to 900 MPa and the sheet metal part (40) has a strength in the range from more than 900 to above 1400 MPa.

3. The component assembly in accordance with claim 1, wherein the sheet metal part (40) lies in a plane (E) in the region of the attachment of the nut element (10) and also radially outside this region; and in that the free end face (30) of the piercing section (22) is set back from the side remote from the sheet metal contact surface (20).

4. The component assembly in accordance with claim 1, wherein the sheet metal part (40) is provided with a bead (70); in that the side (76) of the sheet metal part (40) remote from the sheet metal contact surface (20) directly outside the bead lies in a plane (E); and in that the free end face (30) of the piercing section (22) projects within the bead (70) in front of the side (76) of the sheet metal part (40) remote from the sheet metal contact surface, but is set back from the named plane (E).

5. The component assembly in accordance with claim 4, wherein the nut element (10) is provided optionally with noses shaped like ribs providing security against rotation which have the shape at the piercing section (22) of ribs which extend in the axial direction and which are arranged at the peripheral surface (34), recesses providing security against rotation are formed in accordance with the shape of the ribs providing security against rotation in the hole rim of the sheet metal part (40).

6. The component assembly in accordance with claim 1, wherein the piercing section (22) of the nut element (10) is polygonal in a plan view with rounded corners (36) at the transitions from one side of the polygon to the next.

7. The component assembly in accordance with claim 6, wherein the head part (14) of the nut element (10) has a polygonal shape corresponding to the polygonal shape of the piercing section (22) in a plan view, likewise with rounded corners (36').

8. The component assembly in accordance with claim 6, characterized wherein the head part (14) of the nut element (10) is circular in a plan view.

9. The component assembly in accordance with claim 7, wherein the piercing section (22) of the nut element (10) has a shape in a plan view which is selected from the group square, rectangular, pentagonal or hexagonal.

10. The component assembly in accordance with claim 1, wherein the piercing section of the nut element (10) and the head part are each at least substantially circular in a plan view.

11. The component assembly in accordance with claim 1, wherein the transition from the peripheral surface (34) of the nut element (10) into the sheet metal contact surface (20) is rounded or has the shape of an oblique surface and forms an included angle with the sheet metal contact surface, viewed in an axial or radial sectional plane, in the range between 85° and 90°.

12. The component assembly in accordance with claim 5, wherein noses shaped like ribs providing security against rotation are provided at the piercing section of the nut element (10) which have the shape of ribs extending from them in the axial direction.

13. The component assembly in accordance with claim 1, wherein the piercing section (22) of the nut element is designed to deform during pressing such that, on displacement of the sheet metal material on the formation of the piercing hole in the sheet metal part and the ring-shaped recess (62) surrounding the piercing hole and the piercing section (22) on the side of the sheet metal part remote from the sheet metal contact surface of the nut element, the constriction and/or groove (26) is formed at the piercing section and capable of receiving sheet metal material which is formed by the upsetting of the element during the piercing of the sheet metal part (40) and/or by a stranglehold of the sheet metal part.

14. The component assembly in accordance with claim 1, wherein the piercing of the sheet metal part (40) is through a clamping hoop stress of the sheet metal material.

15. The component assembly in accordance with claim 1, wherein the piercing of the sheet metal part (40) is through a clamping hoop stress of the sheet metal material.

16. A component assembly comprising a sheet metal part (40) and a self-piercing nut element (10) which is designed for press fitting into the sheet metal part (40), wherein the nut element prior to press fitting into the metal sheet (40) has the following features:
   a head part (14) forming a flange (12), a central bore (16) in the head part which is designed for receiving a bolt element and a central longitudinal axis (18), a sheet metal contact surface (20) formed at the flange (12) in a plane standing at least substantially perpendicular to the central longitudinal axis as well as a piercing section (22) extending away from the head part in the direction of the longitudinal axis on the side of the sheet metal contact surface,
   wherein the nut element is designed for the self-piercing attachment of the nut element into a higher strength sheet metal part (40), such that the piercing section (22) merges directly into the sheet metal contact surface (20) and such that the piercing section (22) has a piercing edge (28) at its free end face with the piercing edge (28) being spaced apart from the sheet metal contact surface (20) by a peripheral surface (34) having before the attachment to the sheet metal part either an axial-parallel extent or an angle included with the longitudinal axis of larger than 0° to 5° in any desired radial planes, which include the longitudinal axis, with the peripheral surface (34) having a divergent extent going from the sheet metal contact surface (20) up to the piercing edge (28), the peripheral surface (34) further having an axial height which corresponds to not more than 100% of the sheet metal thickness, with a radial wall thickness of the piercing section in the region of its free end face from the outer side of the piercing section up to the nominal diameter of the thread corresponding to a thickness between 1.2 times, to 1.8 times of the sheet metal part;
   wherein the sheet metal part (40) has a pierced hole having a shape in accordance with the shape of the piercing section (22);
   wherein the material of the sheet metal part (40) after pressing has a recess (62) surrounding the piercing section (22) on the side (68) of the sheet metal part remote from the sheet metal contact surface (20) and adjacent to the piercing section; and
   wherein the material of a hole rim extends into the nut element (10) due to the formation of the recess (62) and is located in a groove (26) which extends radially into the piercing section (22) and axially into the head part (14) in the region of the transition from the peripheral surface (34) into the sheet metal contact surface (20), wherein the nut element (10) has a strength in the range from 700 to 900 MPa and the sheet metal part (40) has a strength in the range from more than 900 to above 1400 MPa.

* * * * *